United States Patent Office.

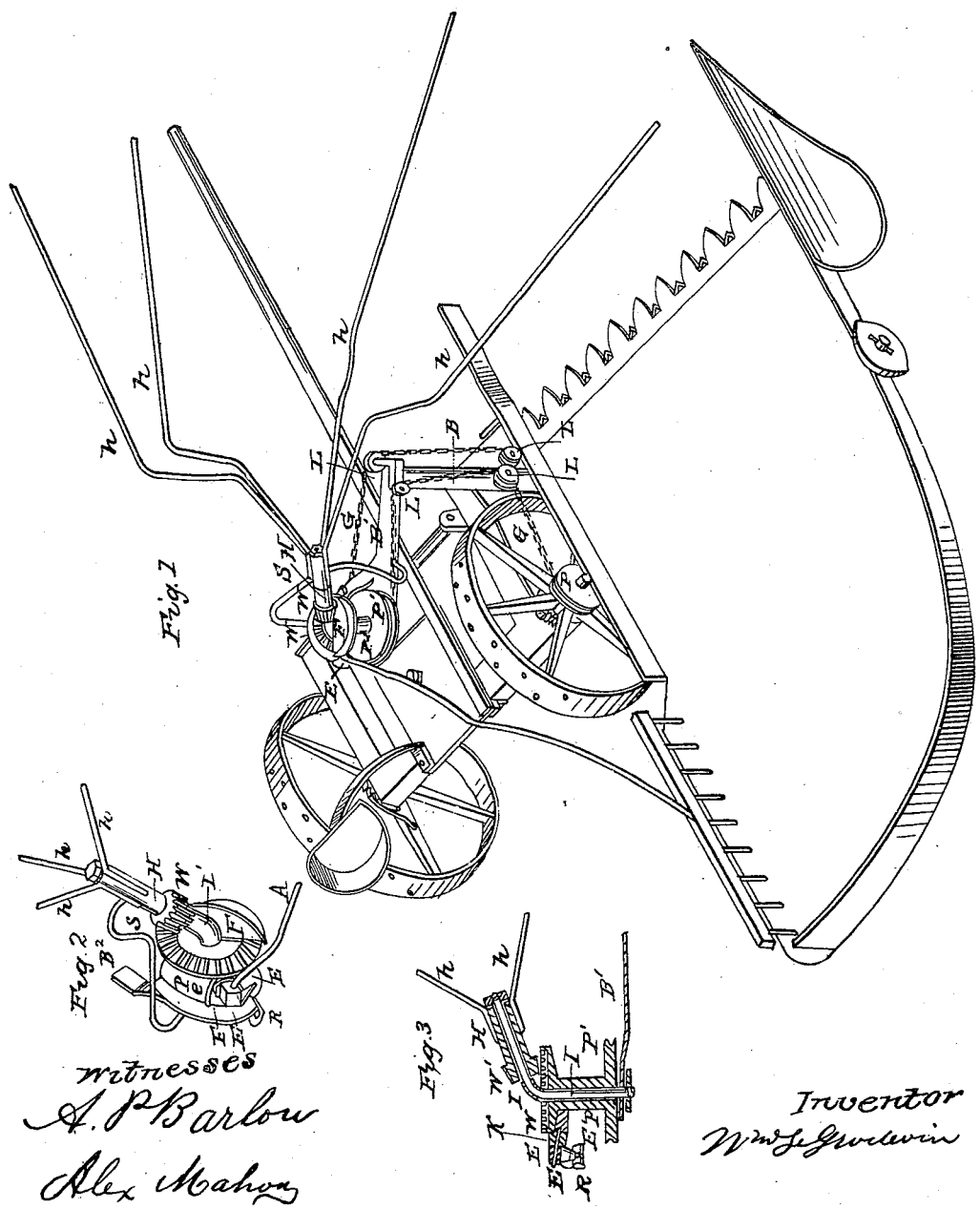

WILLIAM F. GOODWIN, OF EAST NEW YORK, N. Y.

Letters Patent No. 72,841, dated December 31, 1867.

IMPROVEMENT IN HARVESTER-RAKES.

*The Schedule referred to in these Letters Patent and making part of the same.*

TO ALL WHOM IT MAY CONCERN:

Be it known that I, WILLIAM F. GOODWIN, of East New York, county of Kings, and State of New York, have invented certain new and useful Improvements in Harvester-Rakes and Reels; and I do hereby declare the following to be a full, clear, and exact description of the same, reference being had to the accompanying drawings, in which—

Figure 1 is a perspective view of a harvesting-machine embracing my improvements, taken from the rear grain-side corner of the machine.

Figure 2 is a detached front view of the rake and reel-shaft and gearing, and

Figure 3 is a vertical section of the same, the line of section following the bent rake and reel-shaft.

Similar letters of reference denote corresponding parts in all the figures.

My invention consists in a novel arrangement of a revolving rake and an independently-revolving overhanging reel, relative to each other and to the main frame and cutting-apparatus; in locating the shaft or support for an overhanging reel in rear of the cutting-apparatus, and giving to it a forward bend or deflection, whereby the bent arms of the overhanging reel are brought into proper working relation to the cutting-apparatus; and in a novel arrangement of the rake and reel-driving and guiding mechanism, as hereinafter explained.

In the accompanying drawing, I have represented the machine to which the rake is applied as being one of the class known as a vibrating-frame, forward or front-cut, hinge-bar machine, consisting, in this instance, of a main or cutter-frame, connected to and vibrating upon the main axle, an independent draught-frame, two independent driving-wheels, a hinged cutting-apparatus, and a quadrant-shaped platform. These several parts may be made and arranged in any usual or desired form and manner, and of any suitable material usually employed in their construction.

On the heel-extension of the inner shoe, or on the corner of the platform or end of the finger-beam adjacent to said shoe, I mount a standard, B, which, for the purposes of lightness and strength, may be made tubular, and of sufficient height to allow the horizontal arm $B^1$, attached to its upper end, to extend inward over the frame or frames, to a point between the main carrying and driving-wheels. I is an upright angular shaft or arm, rigidly attached to the inner end of horizontal arm $B^1$, upon which is mounted a sprocket-wheel, $P^1$, rigidly connected to or cast with a hollow shaft, $P^2$, also mounted on shaft I, and provided at its upper end with a bevel-wheel, W, cast in one piece with or otherwise rigidly attached to and rotating with the wheel $P^2$ and sprocket-wheel $P^1$. K is an arm or stud, formed upon or attached to sleeve $P^2$ at any suitable point in its length, the outer end of which is armed with a fixed pin or pivot, upon which the angular rake-block E, to which the rake-arm A is attached, is mounted in such manner as to be free to turn or partially rotate, to accommodate the necessary rising and falling movements of the rake during its revolution around the vertical or nearly vertical shaft I. E' is a heel-extension of the rake-block or arm. $B^2$ is an arm or branch of the horizontal arm $B^1$, curved at its outer end, or provided in any suitable manner with a horizontal pin or friction-roller, R, and with a horizontal way or track, F', over which the heel-extension E' passes in elevating the rake, and sustaining it in an elevated position for passing over the frame in its forward or return movement. $e\ e'$ are pins or stops, attached to arm K or to the tubular sleeve which carries it, arranged on opposite sides of the rake-pivot or arm K, and serving, by a proper arrangement relative to the angular rake-block or heel-extension, to regulate the throw of the rake-arm, or the extent of its rotary movement on the fixed pivot or arm K. I' is a hub or sleeve, formed upon or attached to shaft I at its bend or point of deflection, to which the partial cap or flange F is attached, which extends outward upon the platform side of the shaft, and is provided with a curved-lip overhanging bevel-wheel, W, and serving, by its action upon one face of the angular rake-block, to hold the rake firmly down to its work in its passage over the platform. W' is a bevel-wheel, mounted upon the bent arm of the support or shaft I, and gearing with the bevel-wheel W upon the same shaft. H is a tubular reel-shaft, attached to or cast in one piece with bevel-wheel W', and held in place on bent arm or shaft I by means of a nut or other suitable device. Said shaft H is armed with any desired number of angular reel-arms, made in form substantially as shown in fig. 1, and secured to said shaft or sleeve in any suitable manner. The bend or deflection in shaft I is such as to make it overhang its supporting-arm $B^1$, or to give to the reel-shaft which it carries a forward inclination, in such manner as to bring the reel-arms forward from the point of support in rear of the cutting-apparatus toward the line of said cutting-apparatus, when, by a proper bend or deflection of said arms, they are made, in reeling in the grain, to approach and pass over the said cutting-apparatus in a horizontal position, and in a position parallel or nearly parallel therewith. The bend or deflection of the reel-arms may be varied, to adapt them to the varying relation of the reel-support and cutting-apparatus, and the angle of the bent shaft or reel-support in approaching the line of the cutting-apparatus. S is a bent rod or way, attached to the arm $B^1$ at its lower or grain-side end, and made to curve upward and inward, in front of the reel and rake-shaft, to a point in advance of the way or track F', where it is bent abruptly downward and secured to the branch arm $B^2$, as shown by the drawings. Said rod or guide-way serves to regulate the descent of the rake after passing the way F', and preparatory to sweeping the grain off the platform, and may be varied in form as the judgment of the builder may dictate. P is a sprocket-wheel, attached to the inner end of the main axle of the machine, arranged in line or nearly in line with the hinge, between the main frame and the cutting-apparatus, from which sprocket-wheel motion is communicated to the sprocket-wheel $P^1$, on shaft I, by means of a chain, G, passing over pulleys L L L' L', attached to the rake and reel-standard and arm B $B^1$, as represented by the drawing.

The operation is as follows: The machine being drawn forward in the usual manner, the cutting-apparatus and platform are allowed to conform to the inequalities in the surface of the ground through their hinge-connection with the vibrating frame, and the rake and reel supports, mounted upon the cutting-apparatus, maintain a fixed relation thereto. A rotary motion is imparted from the sprocket-wheel P, through the chain G, passing over pulleys L L', arranged as described, to the sprocket-wheel P', and thence to the rake A, and through bevel-wheels W W' to the reel-shaft H, in a manner that will be apparent. The rake being supposed to be in position represented in fig. 1, after having swept the platform, by the further rotation of its vertical shaft, the heel-extension is brought into contact with the friction-roller R, and the rake-block E is turned in such manner as to cause the rake to assume an elevated position for passing over the main frame on its return movement, in which position it is retained, by the action of the way or track F', upon which the rake-heel rests, until the rake-arm reaches and rests upon the elevated end of the inclined way S, when, the rake-heel having passed the way F', said rod serves to regulate the descent of the rake to the front of the platform, for gathering the grain into the cutting-apparatus and sweeping it from the platform. The overhanging lip F serves, by its action upon the angular rake-block, to hold the rake firmly down upon the platform while passing over the same, and the pins or stops e e' serve, one to prevent the rake from dropping upon the ground after it escapes from the platform, and to hold the rake-heel in proper position to be acted upon by the friction-roller R, and the other to regulate the upward throw or degree of elevation of the rake for passing over the frame of the machine.

Having now described my invention, what I claim as new, and desire to secure by Letters Patent, is—

1. An overhanging reel and an independently-revolving rake, supported at a point in rear of the cutting-apparatus and between the driving-wheels, substantially as described.

2. A revolving rake, and an independently-revolving overhanging reel, arranged upon a common shaft or support, in combination with a sprocket-wheel and reel-driving gear arranged upon the same support or shaft, substantially as described.

3. The sprocket-wheel $P^1$, located upon a rake-shaft, arranged between the driving-wheels, and operated from a similar wheel on the end of the drive-wheel axle by means of a chain, G, arranged substantially as described.

4. An inclined reel-shaft, supported at a point in rear of the cutting-apparatus, in combination with the bent or angular reel-arms, substantially as described.

5. The hub I' or its equivalent, intermediate between the bevel-wheels on shaft I, provided with the cap c guide F, substantially as and for the purpose set forth.

6. The combination of standard B, arm $B^1$, bent shaft I, revolving rake A, and an independently-revolving reel, arranged and operating substantially as described.

WM. F. GOODWIN.

Witnesses:
A. P. BARLOW,
ALEX. MAHON.